United States Patent
Mohedas et al.

(10) Patent No.: US 7,230,034 B2
(45) Date of Patent: Jun. 12, 2007

(54) PREVENTION OF AND RECOVERING FROM A CATALYST BED SLUMPING IN A GAS-AGITATED MULTIPHASE REACTOR

(75) Inventors: Sergio R. Mohedas, Ponca City, OK (US); Rafael L. Espinoza, Ponca City, OK (US); Jack E. Cnossen, Ponca City, OK (US); Todd H. Harkins, Ponca City, OK (US); Vincent H. Melquist, Willmar, MN (US); Larry D. Swinney, Stillwater, OK (US)

(73) Assignee: ConocoPhillips Company, Houston, TX (US)

( * ) Notice: Subject to any disclaimer, the term of this patent is extended or adjusted under 35 U.S.C. 154(b) by 381 days.

(21) Appl. No.: 10/804,521

(22) Filed: Mar. 19, 2004

(65) Prior Publication Data

US 2005/0209351 A1  Sep. 22, 2005

(51) Int. Cl.
C07C 27/00 (2006.01)
(52) U.S. Cl. ........................ 518/700; 518/705; 518/709
(58) Field of Classification Search ................ 518/700, 518/705, 709
See application file for complete search history.

(56) References Cited

U.S. PATENT DOCUMENTS

| | | | |
|---|---|---|---|
| 5,252,613 A | 10/1993 | Chang et al. | |
| 5,599,849 A | 2/1997 | Jager et al. | ................. 518/700 |
| 5,844,006 A | 12/1998 | Jager et al. | ................. 518/700 |
| 6,160,026 A | 12/2000 | Dai et al. | |
| 6,462,098 B1 | 10/2002 | Vogel et al. | ................. 518/700 |
| 6,696,502 B1 * | 2/2004 | Mart et al. | ................. 518/709 |

FOREIGN PATENT DOCUMENTS

| | | |
|---|---|---|
| WO | WO 00/45948 | 8/2000 |
| ZA | 94/0582 | 1/1994 |

OTHER PUBLICATIONS

Sie et al., *Fundamentals and Selection of Advanced Fischer-Tropsch Reactors*, Applied Catalysis A: General 1856 (1999) pp. 55-70.
PCT International Search Report for International Application No. PCT/US05/004800 dated May 15, 2005 (2 p.).

\* cited by examiner

*Primary Examiner*—J. Parsa
(74) *Attorney, Agent, or Firm*—Conley Rose P.C.

(57) ABSTRACT

The invention relates to methods for prevention of and recovery from a catalyst bed slumping in a gas-agitated multiphase hydrocarbon synthesis reactor, while the reactor is either under non-reactive conditions or under reaction promoting conditions when syngas is converted to products. The reactor contains a catalyst bed comprising catalyst particles and a gas injection zone suitable for injecting a reactor gas feed. A method for preventing bed slumping comprises supplying a supplemental gas to the gas-agitated multiphase reactor to prevent the catalyst bed from slumping due to insufficient reactor gas feed flow. The method may include recycling some or all of the supplemental gas to the reactor. The method may further comprise separating the gas injection zone from the catalyst bed with a porous plate so as to prevent migration of catalyst particles into the gas injection zone and to minimize plugging of gas distributor(s) present in said zone.

70 Claims, 2 Drawing Sheets

PREVENTION OF AND RECOVERING FROM A CATALYST BED SLUMPING IN A GAS-AGITATED MULTIPHASE REACTOR

BACKGROUND OF THE INVENTION

1. Field of the Invention

The present invention is related to the field of gas-agitated multiphase reactors and more specifically to the prevention of and recovery from Fischer-Tropsch catalyst bed slumping.

2. Background of the Invention

Natural gas, found in deposits in the earth, is an abundant energy resource. For example, natural gas commonly serves as a fuel for heating, cooking, and power generation, among other things. The process of obtaining natural gas from an earth formation typically includes drilling a well into the formation. Wells that provide natural gas are often remote from locations with a demand for the consumption of the natural gas.

Thus, natural gas is conventionally transported large distances from the wellhead to commercial destinations in pipelines. This transportation presents technological challenges due in part to the large volume occupied by a gas. Because the volume of a gas is so much greater than the volume of a liquid containing the same number of gas molecules, the process of transporting natural gas typically includes chilling and/or pressurizing the natural gas in order to liquefy it. However, this contributes to the final cost of the natural gas.

Further, naturally occurring sources of crude oil used for liquid fuels such as gasoline and middle distillates have been decreasing, and supplies are not expected to meet demand in the coming years. Middle distillates typically include heating oil, jet fuel, diesel fuel, and kerosene. Fuels that are liquid under standard atmospheric conditions have the advantage that in addition to their value, they can be transported more easily in a pipeline than natural gas, since they do not require the energy, equipment, and expense required for liquefaction.

Thus, for all of the above-described reasons, there has been interest in developing technologies for converting natural gas to more readily transportable liquid fuels, i.e. to fuels that are liquid at standard temperatures and pressures. One method for converting natural gas to liquid fuels involves two sequential chemical transformations. In the first transformation, natural gas or methane, the major chemical component of natural gas, is reacted with oxygen and/or steam to form synthesis gas, which is a combination of carbon monoxide and hydrogen. In the second transformation, which is known as the Fischer-Tropsch synthesis, carbon monoxide is reacted with hydrogen to form organic molecules containing mainly carbon and hydrogen. Those organic molecules containing carbon and hydrogen are known as hydrocarbons. In addition, other organic molecules containing oxygen in addition to carbon and hydrogen, which are known as oxygenates, can also be formed during the Fischer-Tropsch synthesis. Hydrocarbons comprising carbons having no ring formation are known as aliphatic hydrocarbons and are particularly desirable as the basis of synthetic diesel fuel.

Typically, the Fischer-Tropsch product stream contains hydrocarbons having a range of numbers of carbon atoms, and thus has a range of molecular weights. Therefore, the Fischer-Tropsch products produced by conversion of synthesis gas commonly contain a range of hydrocarbons including gases, liquids and waxes. Depending on the molecular weight product distribution, different Fischer-Tropsch product mixtures are ideally suited to different uses. For example, Fischer-Tropsch product mixtures containing liquids may be processed to yield gasoline, diesel, and jet fuel, as well as heavier middle distillates. Hydrocarbon waxes may be subjected to an additional hydroprocessing step for conversion to a liquid and/or a gaseous hydrocarbon. Thus, in the production of a Fischer-Tropsch product stream for processing to a fuel, it is desirable to maximize the production of high value liquid hydrocarbons, such as hydrocarbons with at least 5 carbon atoms per hydrocarbon molecule ($C_{5+}$ hydrocarbons).

The Fischer-Tropsch synthesis process is commonly facilitated by a catalyst. Catalysts desirably have the function of increasing the rate of a reaction without being consumed by the reaction. A feed containing carbon monoxide and hydrogen is typically contacted with a catalyst in a reaction zone that may include one or more reactors.

The catalyst may be contacted with synthesis gas in a variety of reaction zones that may include one or more reactors, either placed in series, in parallel or both. Common reactors include packed bed (also termed fixed bed) reactors and slurry bed reactors. Common reactors may also include fluid bed or transport bed reactors. Originally, the Fischer-Tropsch synthesis was carried out in packed bed reactors. These reactors have several drawbacks, such as temperature control, that can be overcome by gas-agitated slurry reactors or slurry bubble column reactors. Gas-agitated multiphase reactors comprising catalytic particles sometimes called "slurry reactors," "ebullating bed reactors," "slurry bed reactors" or "slurry bubble column reactors," operate by suspending catalytic particles in liquid and feeding gas reactants into the bottom of the reactor through a gas distributor, which produces small gas bubbles. As the gas bubbles rise through the reactor, the reactants are absorbed into the liquid and diffuse to the catalyst where, depending on the catalyst system, they are typically converted to gaseous and liquid products. The gaseous products formed enter the gas bubbles and are collected at the top of the reactor. Liquid products are recovered from the suspending liquid by using different techniques like filtration, settling, hydrocyclones, magnetic techniques, etc. Some of the principal advantages of gas-agitated multiphase reactors or slurry bubble column reactors (SBCRs) for the exothermic Fischer-Tropsch synthesis are the very high heat transfer rates, and the ability to remove and add catalyst online. Sie and Krishna (Applied Catalysis A: General 1999, 186, p. 55), incorporated herein by reference in its entirety, give a history of the development of various Fischer-Tropsch reactors.

Drawbacks to using gas-agitated multiphase reactors include catalyst slumping. For instance, the reactant gas supply may be shut off temporarily or long-term, and the catalyst particles then settle, which causes the catalyst bed to slump. A further drawback includes plugging of the gas distributor.

Consequently, there is a need for an improved method for operating a gas-agitated multiphase reactor. A further need exists for preventing slumping of a catalyst bed. In addition, there exists a need for preventing and recovering from a slumped catalyst bed.

BRIEF SUMMARY OF SOME OF THE PREFERRED EMBODIMENTS

These and other needs in the art are addressed in one embodiment by a method for operating a gas-agitated fluidized bed hydrocarbon synthesis reactor, wherein the fluidized bed comprises catalyst particles that are prone to slumping at times when an insufficient rate of gas is supplied to the fluidized bed. The method comprises providing the hydrocarbon synthesis reactor comprising a catalyst bed and a gas injection zone, wherein the catalyst bed comprises catalyst particles, and wherein the gas injection zone is suitable for injecting a reactor gas feed with a reactor gas feed flow rate to the catalyst bed, and further wherein the gas injection zone comprises at least one gas distributor. In addition, the method comprises selecting a reference flow rate that is sufficient to disperse substantially all of the catalyst particles in the bed. The method further comprises passing a reactor gas supply from the at least one gas distributor in the gas injection zone through the catalyst bed, wherein the reactor gas supply comprises at least a portion of the reactor gas feed; and supplying a supplemental gas to the gas injection zone when the reactor gas feed flow rate becomes less than the reference flow rate. The flow rate is sufficient to disperse substantially all of the catalyst particles in the catalyst bed. The reactor gas supply may comprise a reactant gas, an unreactive gas, or mixture thereof. In some embodiments, when the reactor is under reaction promoting conditions, the reactor gas supply comprises a reactant gas. In preferred embodiments, at least a portion of the catalyst particles are active for Fischer-Tropsch synthesis; the reactor gas supply preferably comprises a reactant gas, which contains carbon monoxide and hydrogen; and the supplemental gas preferably comprises at least one gas selected from the group consisting of a hydrocarbon having no more than five carbon atoms, natural gas, argon, nitrogen, hydrogen, carbon dioxide, and combinations thereof A further embodiment includes a method for operating a gas-agitated hydrocarbon synthesis reactor having a bed of catalyst elements that are prone to slumping at times of insufficient gas flow into the reactor. The method comprises providing the gas-agitated hydrocarbon synthesis reactor comprising a catalyst bed and a gas injection zone, wherein the catalyst bed comprises catalyst particles, and wherein the gas injection zone is suitable for injecting a reactor gas feed to said catalyst bed, and further wherein the gas injection zone comprises at least one gas distributor. The method further comprises selecting a reference flow rate, wherein the reference flow rate is sufficient to disperse substantially all of the catalyst particles in the catalyst bed. In addition, the method comprises passing a gas stream with a gas stream flow rate from the at least one gas distributor in the gas injection zone through the catalyst bed. Moreover, the method comprises supplying a supplemental gas from the injection zone of the catalyst bed at a time of insufficient flow of said gas stream so as to achieve a total reactor gas feed flow rate equal to or greater than the reference flow rate, wherein the total reactor gas feed flow rate comprises the flow rate of said gas stream and the flow rate of supplemental gas.

An additional embodiment comprises a method of operating a gas-agitated multiphase reactor having catalyst elements that are prone to slumping at times of insufficient gas flow through the multiphase reactor. The method comprises supplying a reactant gas at a reactant gas flow rate to the gas-agitated multiphase reactor, measuring the reactant gas supply flow rate; comparing the measured flow rate of the reactant gas to a reference flow rate; supplying a supplemental gas to the gas-agitated multiphase reactor when the reactant gas flow rate falls below said reference flow rate so as to provide a total gas flow rate above the reference flow rate, wherein the total gas flow rate is the combination of reactant gas and supplemental gas being supplied to the reactor.

In another embodiment, the invention comprises an apparatus for recovery from catalyst slumping of a gas-agitated multiphase reactor, wherein the apparatus comprises a reactor, wherein the apparatus comprises a reaction zone having a plurality of catalyst particles; a gas injection zone having at least one gas distributor; and a porous plate disposed between the reaction zone and the gas injection zone, wherein the porous plate comprises a plurality of perforations having open areas, and wherein at least a portion of the perforations comprise a size sufficient to retain a substantial portion of catalyst particles in the reaction zone, so as to substantially prevent plugging of the at least one gas distributor by catalyst particles. The perforations of the porous plate allow the gas fed to the reactor to pass through the porous plate. Preferably, about 90 percent by weight of the catalyst particles have a fresh size equal to or greater than the size of the plurality of perforations in the porous plate. In some embodiments, at least a portion of the perforations in the porous plate have a size less than about 20 microns, and the catalyst particles comprise a fresh size of from about 20 microns to about 200 microns.

In a further embodiment, the invention provides a method of preventing and recovering from slumping of a catalyst bed in a gas-agitated multiphase reactor, wherein the catalyst bed comprises a plurality of catalyst particles, and wherein the gas-agitated multiphase reactor has at least one reaction zone and a gas injection zone. The method comprises supplying a reactant gas with a reactant gas supply flow rate to the gas-agitated multiphase reactor, measuring the reactant gas supply flow rate; and comparing the measured flow rate of the reactant gas to a reference flow rate. The invention further comprises supplying a supplemental gas to the gas-agitated multiphase reactor.

According to an additional embodiment, the invention provides a method of operating a hydrocarbon synthesis reactor, wherein the hydrocarbon synthesis reactor comprises a catalyst slurry, i.e., a plurality of catalyst particles suspended in a liquid. The method comprises supplying a reactant gas to the hydrocarbon synthesis reactor, wherein the reactant gas is supplied to the hydrocarbon synthesis reactor in a gas injection zone, and wherein the reactant gas has a reactant gas supply flow rate to the hydrocarbon synthesis reactor; and reacting the reactant gas with the plurality of catalyst particles in a reaction zone. The invention further comprises measuring the reactant gas supply flow rate to the hydrocarbon synthesis reactor; comparing the measured flow rate of the reactant gas to a reference flow rate; and supplying a supplemental gas to the hydrocarbon synthesis reactor in the reaction zone, wherein the supplemental gas is supplied to the hydrocarbon synthesis reactor when the measured flow rate of the reactant gas falls below the reference flow rate, so as to provide to the hydrocarbon synthesis reactor a total gas flow rate of reactant gas and supplemental gas equal to or greater than the reference flow rate.

It will therefore be seen that a technical advantage of the present invention includes supplying a supplemental gas to a reactor, which prevents a catalyst bed from slumping due to insufficient gas flow fed to a hydrocarbon synthesis reactor. For instance, problems encountered when the flow of reactor gas supply is interrupted or decreased are overcome. The prevention of bed slumping can be done on an operational reactor under reaction promoting conditions when a portion of the gas fed to said operational reactor is converted to products while its passes through the catalyst bed, or on a non-operational reactor under non-reactive conditions, such as during the start-up of the reactor, when substantially of the gas fed to said non-operational reactor is not converted while its passes through the catalyst bed.

A further advantage of the present invention includes the use of a porous plate inside the reactor, which allows recovery from a slumped catalyst bed. The porous plate is preferably placed in the reactor above the gas injection zone, such that, in the event of a bed slumping, a substantial portion of the catalyst particles deposit on said porous plate and are prevented from migrating into the gas injection zone so as to minimize plugging of at least one gas distributor present in the gas injection zone.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

To more clearly illustrate the present invention, several drawings are presented. However, no limitations to the current invention should be ascertained from the drawings presented herein below.

Figure 1:
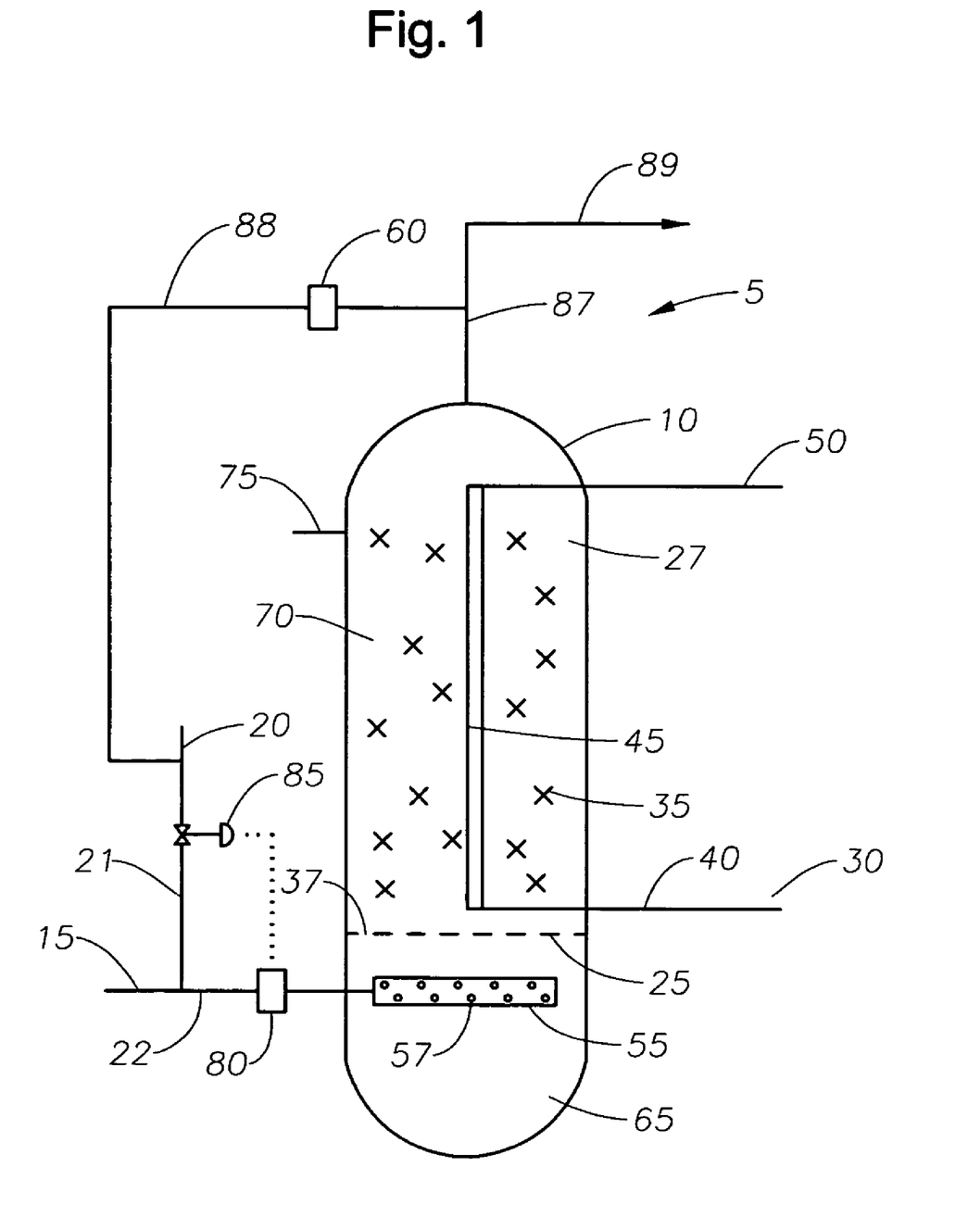
FIG. 1 illustrates a Fischer-Tropsch reactor system having a gas-agitated multiphase reactor, a reactor gas supply, a supplemental gas supply, a cooling unit, and an optional porous plate.

FIG. 1 illustrates a hydrocarbon synthesis process 5 having a hydrocarbon synthesis reactor 10, a reactor gas supply 15, a supplemental gas supply 20, and an optional porous plate 25. Hydrocarbon synthesis reactor 10 comprises a gas-agitated multiphase reactor. Hydrocarbon synthesis reactor 10 can be operational i.e., when reactor gas supply 15 comprises a reactant gas, and when hydrocarbon synthesis reactor 10 comprises reaction promoting conditions such as a portion of the reactant gas is converted to products. Alternatively, hydrocarbon synthesis reactor 10 can be in a non-operational state, i.e., when reactor gas supply 15 does not comprise a reactant gas and/or when conditions in hydrocarbon synthesis reactor 10 do not promote reaction. Hydrocarbon synthesis reactor 10 comprises any gas-agitated multiphase reactor in which products can be generated from a reactor gas feed comprising synthesis gas by Fischer-Tropsch synthesis, alcohol synthesis, or any other suitable synthesis. Hydrocarbon synthesis reactor 10 preferably comprises a Fischer-Tropsch synthesis. Hydrocarbon synthesis reactor 10 also comprises a catalyst bed 27. Hydrocarbon synthesis reactor 10 further comprise a coolant system 30. Catalyst bed 27 comprises a plurality of catalyst particles 35, wherein at least a portion of said catalyst particles 35 are preferably active in Fischer-Tropsch synthesis. Catalyst particles 35 for use in hydrocarbon synthesis reactor 10 are well known in the art and may include at least one catalytic metal from the Group 8, 9, and 10 metals of the Periodic Table (in the new IUPAC notation, as found in, for example, the CRC Handbook of Chemistry and Physics, $81^{rst}$ Edition, D. R. Lide, Ed., CRC Press, Inc., 2000–2001, and used throughout this specification as the reference for all element group numbers). For instance, suitable catalytic metals include cobalt, iron, nickel, ruthenium, and combinations thereof. Catalyst particles 35 preferably comprise a catalytic metal selected from the group consisting of cobalt, ruthenium, and combination thereof. Catalyst particles 35 may further comprise at least one promoter. Promoters are well known in the art and may include any suitable promoter for improving the performance of the catalyst, such as productivity, longevity, selectivity, conversion, reducibility, or regenerability. The promoter may vary according to the catalytic metal. A promoter can be an element that also, in an active form, has catalytic activity in the absence of the catalytic metal. Such an element will be termed herein a promoter when it is present in the catalyst in a lesser weight percent than the catalytic metal. A promoter is preferably a Fischer-Tropsch promoter, which is an element or compound that enhances the performance of the catalyst for the production of hydrocarbons from a reactant gas comprising synthesis gas. When the catalytic metal comprises cobalt, the promoter preferably comprises platinum, palladium, ruthenium, rhenium, silver, boron, or combinations thereof. When the catalytic metal comprises iron, the promoter preferably comprises copper, silver, lithium, sodium, potassium, manganese, zinc, or combinations thereof. When the catalytic metal comprises ruthenium, the promoter preferably comprises rhenium. In addition, catalyst particles 35 may comprise a support material. Suitable support materials comprise an inorganic oxide, such as silica, alumina, titania, zirconia, and combinations thereof Catalyst particles 35 may comprise any size suitable for use in hydrocarbon synthesis process 5, preferably catalyst particles 35 comprise a fresh size from about 20 microns to about 200 microns. Catalyst particles 35 are not limited to a fresh size of from about 20 microns to about 200 microns, but instead may comprise any size, when fresh, suitable for use in hydrocarbon synthesis process 5. Preferably, catalyst particles 35 in reactor 10 have a weight average particle size between about 30 microns and 150 microns. During long-term operation of hydrocarbon synthesis process 5, the conditions inside hydrocarbon synthesis reactor 10 can be such that catalyst particles 35 in catalyst bed 27 may suffer from physical and/or chemical attrition. In such case, some of catalyst particles 35 break down over time, sub-particles of various sizes may be created, including very small particles known as "fines," some of which may even be sub-micron in size. Hence, catalyst particles 35 may further comprise some subparticles. Catalyst bed 27 comprises a catalyst weight percent (wt %) between about 20 wt % and about 40 wt %, preferably between about 25 wt % and about 35 wt %.

Reactor gas supply 15 of FIG. 1 is preferably disposed to supply a reactant gas to hydrocarbon synthesis reactor 10.

The reactant gas comprises synthesis gas. Supplemental gas supply 20 is disposed to supply a supplemental gas to hydrocarbon synthesis reactor 10. The supplemental gas comprises any gas suitable for use in hydrocarbon synthesis process 5. The supplemental gas preferably comprises at least one gas selected from the group consisting of nitrogen, argon, any hydrocarbon having five carbon atoms or less, natural gas, hydrogen, carbon dioxide, and combinations thereof. The supplemental gas preferably comprises an inert gas, which is defined as a gas that is unreactive with the catalyst under the Fischer-Tropsch reaction conditions. The inert gas comprises but is not limited to at least one gas selected from the group consisting of nitrogen, argon, hydrocarbons having five carbon atoms or less, natural gas, carbon dioxide, and combinations thereof. Preferably, the supplemental gas is substantially free of molecular oxygen and is substantially desulfurized, thereby substantially free of sulfur. The supplemental gas is substantially free of sulfur when the sulfur concentration in the supplemental gas is less than about 1 ppm by weight, preferably less than 0.1 ppm by weight, more preferably less than 0.01 ppm by weight. The supplemental gas is substantially free of molecular oxygen when the oxygen concentration in the supplemental gas is less than about 1,000 ppm by weight, preferably less than 100 ppm by weight, more preferably less than 10 ppm by weight.

As further illustrated on FIG. 1, a reactor gas feed 22 is fed to hydrocarbon synthesis reactor 10. Reactor gas feed 22 comprises reactor gas supply 15, a supplemental gas feed 21, or combination thereof. Supplemental gas feed 21 comprises supplemental gas supply 20 and optionally a recycle supplemental gas stream 88. At least one flowmeter 80 can measure the flow rate of reactor gas feed 22 to gas injection zone 65. Flowmeters are well known in the art, and flowmeter 80 may comprise any suitable flowmeter for measuring the flow rate of a gas in hydrocarbon synthesis process 5. The flow rate of reactor gas feed 22 as measured by the at least one flowmeter 80 is compared to a reference flow rate. The reference flow rate comprises a minimum fluidization velocity, which corresponds to a minimum gas flow rate to hydrocarbon synthesis reactor 10 to disperse substantially all of catalyst particles 35 in catalyst bed 27, which substantially prevents catalyst bed 27 from slumping. 90% of catalyst particles 35 by weight have a particle size between 20 and 150 microns. In addition, catalyst particles 35 have a weight average particle size between 30 and 150 microns, more preferably between 50 and 90 microns. Preferably, the slurry has a solids loading from about 5 wt. % to about 40 wt. % and a minimum fluidization velocity of 1.5 cm/second measured as a superficial gas velocity (actual volumetric gas rate divided by available cross sectional area in the reactor) at actual reactor pressure, temperature, and slurry solids loading. Alternatively, the reference flow rate may comprise a flow rate within a desired range above the minimum fluidization velocity. It is to be understood that the minimum fluidization velocity may vary between reactor systems and is dependent on factors such as catalyst weight fraction in the slurry, the height of the catalyst bed, the density of the catalyst particles, and the like. Processes and equipment for comparing the flow rate of reactor gas feed 22 to the reference flow rate are well known in the art, and the present invention comprises any such suitable processes and equipment. When reactor gas supply 15 has a flow rate insufficient to disperse catalyst particles 35 in catalyst bed 27, i.e., the flow rate of reactor gas supply 15 is less than, about equal to, or within a desired range of the reference flow rate and may cause a bed slumping, flowmeter 80 indicates that the flow rate of reactor gas feed 22 is insufficient. A signal representing the flow rate of reactor gas feed 22 can be sent to a supplemental gas valve 85 from the at least one flowmeter 80. Supplemental gas valve 85 may comprise any suitable flow control valve. When the flow rate of reactor gas feed 22 is less than, about equal to, or within a desired range of the reference flow rate, supplemental gas valve 85 can allow an amount of the supplemental gas to flow from supplemental gas feed 21 (which comprises supplemental gas supply 20) to combine with reactant gas supply 15, such that reactor gas feed 22 comprises a combination of reactor gas supply 15 and supplemental gas feed 21. Since the flow rate of the total reactor gas feed 22 to gas injection zone 65 comprises the combined flow rates of supplemental gas feed 21 and reactant gas supply 15, the addition of the supplemental gas feed 21 to reactor gas feed 22 enhances the flow rate of reactor gas feed 22. Supplemental gas valve 85 regulates the flow of supplemental gas feed 21 in order to have a flow rate of reactor gas feed 22 equal to about the reference flow rate or greater than the reference flow rate. In some embodiments, the flow of reactor gas supply 15 is substantially shut off, and supplemental gas feed 21 comprises substantially all of reactor gas feed 22. The flow rate of reactor gas feed 22 may have from 0 to 100% of its flow rate from reactor gas supply 15, from 0 to 100% of its flow rate from supplemental gas feed 21, or combination thereof, as long as the flow rate of reactor gas feed 22 remains at about or greater than the reference flow rate.

At the onset of a bed slumping event, supplemental gas feed 21 may comprise solely supplemental gas supply 20. As the feed gas passes through hydrocarbon synthesis reactor 10, at least a portion of the gas exiting hydrocarbon synthesis reactor 10, shown as recycle supplemental gas stream 88, can be recycled at least in part to hydrocarbon synthesis reactor 10. Recycle supplemental gas stream 88 can be combined with supplemental gas supply 20 to form supplemental gas feed 21.

The coolant system 30 of FIG. 1 comprises a coolant supply 40, a coolant zone 45, and a coolant outlet 50. Hydrocarbon synthesis process 5 further comprises a gas distributor 55. Gas distributor 55 comprises a plurality of perforations 57. Gas distributor 55 is disposed to inject reactor gas feed 22 to hydrocarbon synthesis reactor 10. A gas distributor 55 is well known in the art and may comprise any suitable apparatus having perforations 57 for injecting a gas into hydrocarbon synthesis reactor 10. A suitable gas distributor preferably comprises one or more spargers having one or more rings or rods, one or more nozzles, or combinations thereof.

Hydrocarbon synthesis process 5 may further comprise a porous plate 25 as shown in FIG. 1. Porous plate 25 comprises a plurality of perforations 37, wherein at least a portion of the perforations comprise a size sufficient to substantially prevent plugging of gas distributor 55 by catalyst particles 35. In a bed slumping event when there is insufficient gas flow fed to hydrocarbon synthesis reactor 10 to disperse catalyst particles 35 in catalyst bed 27, most of the catalyst particles 35 start settling down throughout catalyst bed 27 towards porous plate 25. The perforations of porous plate 25 should be such that a substantial portion of the settling catalyst particles 35 deposit on porous plate 25 such that porous plate 25 allows the retention of a substantial portion of the catalyst particles 35 in reaction zone 70 in a bed slumping event while porous plate 25 minimizes the migration of settling catalyst particles 35 into gas injection zone 65. The perforations 37 of porous plate 25 should allow all of the gas fed to hydrocarbon synthesis reactor 10 to pass through porous plate 25 from gas injection zone 65 to catalyst bed 27. At least a portion of perforations 37 comprise a size of less than about 20 microns. In alternative embodiments, the size of each perforation 37 is selected so that at least about 90 percent by weight of fresh catalyst particles 35 have a size about equal to or larger than the size of each perforation 37. The combined open area of the plurality of perforations 37 comprises a total open area of porous plate 25. In addition, porous plate 25 has a cross-sectional area, and hydrocarbon synthesis reactor 10 has a cross-sectional area. The total open area of porous plate 25 is less than the cross-sectional area of porous plate 25, preferably the total open area of porous plate 25 is from about 10 to about 90 percent of the cross-sectional area of porous plate 25. Moreover, the cross-sectional area of porous plate 25 comprises from about 10 to about 100 percent of the cross-sectional area of hydrocarbon synthesis reactor 10. In addition, porous plate 25 comprises any metal, ceramic, plastic, and the like that may be suitable for the reaction conditions of hydrocarbon synthesis process 5. Porous plate 25 may also comprise at least one of a single layer and multiple layers. Porous plate 25 may be secured to hydrocarbon synthesis reactor 10 by welds, hooks, grooves, and the like. Porous plate 25 may comprise one component part or an assembly of components parts. It is envisioned that two or more porous plates can be used within hydrocarbon synthesis reactor 10, which can be placed at various elevations within catalyst bed 27. When one porous plate 25 is used in the reactor, FIG. 1 illustrates porous plate 25 and gas distributor 55 as being distinct devices; however, in an alternate embodiment (not illustrated), it is believed that gas distributor 55 and porous plate 25 may be comprised within one device. Also, with porous plate 25 placed above gas distributor 55, it is believed that the effectiveness of gas distributor 55 does not have to be as efficient as that of gas distributor 55 in the absence of porous plate 25.

Additional alternative embodiments include hydrocarbon synthesis process 5 comprising a supplemental gas recycle unit 60, in which at least a portion of the supplemental gas is recycled to hydrocarbon synthesis reactor 10. Supplemental gas recycle unit 60 may comprise at least one of a compressor and/or blower. Compressors and blowers are well known in the art and supplemental gas recycle unit 60 may comprise any suitable compressor and blower for recirculating at least a portion of the supplemental gas. In alternative embodiments, supplemental gas recycle unit 60 can comprise any suitable device for recirculating at least a portion of the supplemental gas.

The following is an exemplary application of the invention as illustrated on FIG. 1. Hydrocarbon synthesis reactor 10 comprises a slurry phase reactor or a slurry bubble reactor. In operation, the plurality of catalyst particles 35 are suspended in a liquid to form a catalyst slurry. Catalyst bed 27 comprises the catalyst slurry. Reactor gas feed 22 comprising the reactor gas supply 15 is introduced to gas distributor 55. The reactor gas feed 22 is injected into a gas injection zone 65 of hydrocarbon synthesis reactor 10 through perforations 57 of gas distributor 55. If a porous plate 25 is placed above gas distributor 55 (as illustrated in FIG. 1), the reactor gas feed rises up from gas injection zone 65 through perforations 37 of porous plate 25 and passes into a reaction zone 70, which comprises catalyst bed 27. In alternative embodiments, the present invention comprises more than one reaction zone 70. Coolant system 30 can maintain the temperature of catalyst bed 27 within a desired range. Hydrocarbon synthesis reactor 10 can be maintained under non-reactive conditions, such as at a temperature preferably less than about 180° C., or under reaction promoting conditions comprising a temperature between about 185° C. and about 300° C., preferably between about 190° C. and about 260° C. A coolant fluid comprising a coolant liquid, a coolant gas, or combinations thereof can be supplied from coolant supply 40 to coolant zone 45, which is disposed within catalyst bed 27. The coolant fluid may comprise any suitable fluids for use in cooling catalyst bed 27, preferably the coolant fluid comprises water and/or steam. Coolant zone 45 comprises at least one coolant tube. In alternative embodiments, coolant zone 45 comprises a plurality of coolant tubes. From coolant zone 45, the coolant fluid exits hydrocarbon synthesis reactor 10 through coolant outlet 50. It is to be understood that the hydrocarbon synthesis process 5 of the present invention is not limited to coolant system 30 but instead can operate without coolant system 30. Alternatively, hydrocarbon synthesis process 5 of the present invention can use more than one coolant system 30, such as for example, when two coolant systems 30 are employed, one coolant system 30 can be located in the top half of catalyst bed 27, while another coolant system 30 may be located in the bottom half of catalyst bed 27.

In a preferred embodiment of FIG. 1, reactor gas supply 15 comprises a reactant gas containing a mixture of hydrogen and carbon monoxide (synthesis gas). When reactor gas feed 22 which comprises reactor gas supply 15, and hence the reactant gas, is injected into gas injection zone 65 under reaction promoting conditions, at least a portion of the reactant gas is converted to products. Products of hydrocarbon synthesis process 5 exit hydrocarbon synthesis reactor 10 at product line 75. The product may comprise saturated or unsaturated hydrocarbons (such as alkanes and alkenes) and/or oxygenated hydrocarbons (such as alcohols, aldehydes, and the like). Preferably, the product comprises primarily hydrocarbons. More preferably, the product comprises primarily hydrocarbons with 5 or more carbon atoms ($C_{5+}$).

In alternative embodiments of FIG. 1, reactor gas feed 22 is injected into gas injection zone 65 under non-reactive conditions. Non-reactive conditions include any conditions wherein substantially all of reactor gas feed 22 is unconverted while passing through hydrocarbon synthesis reactor 10. For instance, non-reactive conditions include a temperature less than about 180° C. and/or employing a reactor gas feed 22 that does not comprise a reactant gas. In such an alternative embodiment, it is envisioned that reactor gas supply 15 may not comprise a reactant gas but instead, reactor gas supply 15 comprises one unreactive gas selected from the group consisting of any hydrocarbon having 5 carbon atoms or less, natural gas, argon, nitrogen, hydrogen, carbon dioxide, and combinations thereof. In further alternative embodiments, reactor gas feed 22 comprises at least one of such unreactive gas in addition to a reactant gas.

As illustrated further in FIG. 1, when the flow rate of reactor gas supply 15 is less than, about equal to, or within a range of the reference flow rate, an amount of supplemental gas is added to reactor gas feed 22 so as to maintain a flow rate equal to or above the reference flow rate. In the embodiment having porous plate 25 disposed above gas distributor 55, the gas feed comprising the supplemental gas, which is injected to hydrocarbon synthesis reactor 10 through gas distributor 55 in gas injection zone 65, migrates upwards, and passes through perforations 37 of porous plate 25 and up through catalyst bed 27. Substantially of the supplemental gas passes through catalyst bed 27 without being converted and exits hydrocarbon synthesis reactor 10 through a reactor gas effluent 87. Supplemental gas recycle unit 60 can recycle at least a portion of reactor gas effluent 87 comprising the supplemental gas. Preferably, a recycle supplemental gas stream 88 is generated by supplemental gas recycle unit 60 and is recycled to any point in hydrocarbon synthesis process 5. Preferably, recycle supplemental gas stream 88 is combined with supplemental gas supply 20 as shown in FIG. 1 to form supplemental gas feed 21. The flow of supplemental gas feed 21 comprises the combined flows of recycle supplemental gas stream 88 and supplemental gas supply 20, and the flow rate of supplemental gas feed 21 may be regulated by the opening or closing of supplemental gas valve 85 in order for supplemental gas feed 21 to be added to reactor gas feed 22 (as shown in FIG. 1). Alternative embodiments comprise not recycling at least a portion of the reactor gas effluent 87 when reactor gas effluent 87 comprises the supplemental gas. In such alternative embodiments, a non-recycled portion 89 of reactor gas effluent 87, which is not sent through supplemental gas recycle unit 60, then exits hydrocarbon synthesis process 5. It is to be understood that the present invention is not limited to recycling at least a portion of reactor gas effluent 87 comprising the supplemental gas but also includes recycling all or none of reactor gas effluent 87 comprising the supplemental gas.

In further alternate embodiments (not illustrated), supplemental gas supply 20 and recycle supplemental gas stream 88 can be added separately to reactor gas feed 22. In such alternative embodiments, recycle supplemental gas stream 88 can be directly combined with reactor gas feed 22, and the flow of recycle supplemental gas stream 88 can be activated by the opening or closing of another valve (not shown).

Additional alternate embodiments (not illustrated) include supplemental gas supply 20, recycle supplemental gas stream 88, and reactor gas feed 22 supplied to hydrocarbon synthesis reactor 10 using separate entry points.

Figure 2:
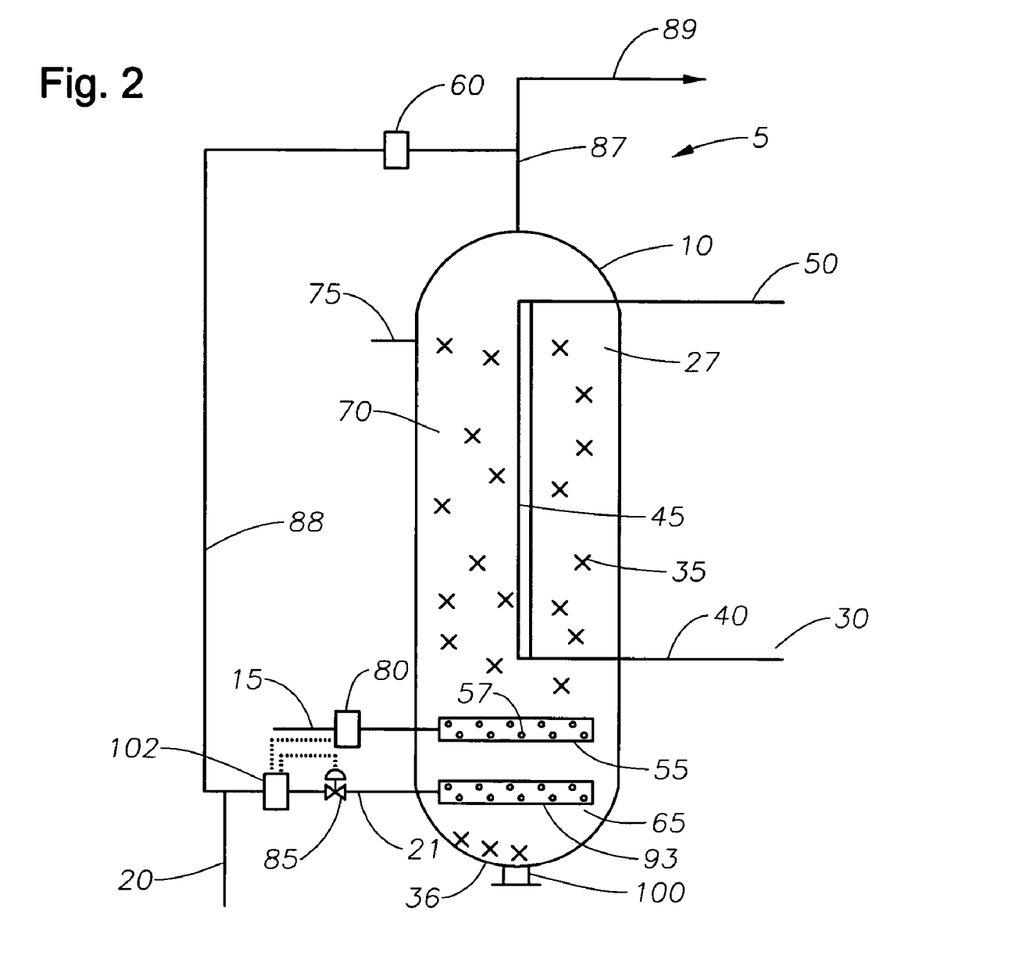
FIG. 2 illustrates a Fischer-Tropsch reactor system having a gas-agitated multiphase reactor, a reactor gas supply, a supplemental gas supply, a cooling unit, and two gas distributors.

FIG. 2 illustrates another embodiment of hydrocarbon synthesis process 5 similar to that described in FIG. 1, except that porous plate 25 is not shown and that reactor gas supply 15 and supplemental gas feed 21 are supplied separately to hydrocarbon synthesis reactor 10 by at least two different gas distributors. Supplemental gas feed 21 comprises supplemental gas supply 20 and recycle supplemental gas stream 88. Flowmeter 80 measures reactor gas supply 15 and compares this measurement to the desired minimum. If the flow is less than the desired minimum, the difference is sent as a setpoint to flowmeter 102, which is used to adjust the flow rate through supplemental gas valve 85. Similarly to FIG. 1, hydrocarbon synthesis reactor 10 can be operational i.e., when reactor gas supply 15 comprises a reactant gas, and when hydrocarbon synthesis reactor 10 comprises reaction promoting conditions such as a portion of the reactant gas is converted to products. Alternatively, hydrocarbon synthesis reactor 10 can be non-operational i.e., when reactor gas supply 15 does not comprises a reactant gas and/or when conditions in hydrocarbon synthesis reactor 10 do not promote reaction. Reactor gas supply 15 is introduced via gas distributor 55, and supplemental gas feed 21 is introduced via a supplemental gas distributor 93. Supplemental gas distributor 93 is illustrated as being below gas distributor 55 in gas injection zone 65; however, in an alternate embodiment of FIG. 2 (not shown), supplemental gas distributor 93 can be located above gas distributor 55 in gas injection zone 65 or in reaction zone 70 located above injection zone 65. It is to be understood that, even though porous plate 25 is not illustrated in FIG. 2, an alternate embodiment of FIG. 2 comprises the use of porous plate 25, wherein porous plate 25 is preferably placed above supplemental gas distributor 93. In another embodiment, porous plate 25 can be placed above gas distributor 55 and supplemental gas distributor 93. Supplemental gas distributor 93 can be located within gas injection zone 65 of hydrocarbon synthesis reactor 10 or above gas injection zone 65. Supplemental gas distributor 93 can also be located above or below gas distributor 55, preferably below gas distributor 55 as shown in FIG. 2. The range of gas flow rate through distributors 55 and 93 can be similar but also can differ.

FIG. 2 also illustrates that hydrocarbon synthesis reactor 10 may further comprise a purge 100. Purge 100 is preferably placed at a location where some of catalyst particles 35 may accumulate after a bed slumping when the flow rate of the reactor gas feed does not meet the minimum fluidization velocity and cannot be adjusted at a level sufficiently high enough to maintain all of catalyst particles 35 in suspension in catalyst bed 27. Purge 100 is preferably placed at the bottom of hydrocarbon synthesis reactor 10 and below gas injection zone 65. Purge 100 can comprise a drain or a purge nozzle. Purge 100 preferably facilitates removal and recovery of accumulated catalyst particles 36 at the bottom of hydrocarbon synthesis reactor 10 after a bed slumping. In the event of a bed slumping, accumulated catalyst particles 36 may become compacted at the bottom of hydrocarbon synthesis reactor 10. It is envisioned, although not illustrated, that at least a fraction of the supplemental gas may be delivered by, for example, one or more injection nozzles in the proximity of purge 100. This fraction of the supplemental gas preferably has a flow rate sufficiently high enough to cause some fluidization of the accumulated catalyst particles 36 so as to minimize compacting of accumulated catalyst particles 36 in the vicinity of purge 100 but has a flow rate sufficient to minimize catalyst fluidization above gas injection zone 65. Hence, in the event of a bed slumping, a dense slurry rich in accumulated catalyst particles 36 may be formed in the vicinity of purge 100, and the catalyst particles in said dense slurry can be maintained in suspension so that the dense slurry is flowable and can be easily removed from hydrocarbon synthesis reactor 10 via purge 100. The recovered catalyst particles from purge 100 can be at least recycled in part to hydrocarbon synthesis reactor 10. After recovery from purge 100, but before recycle to hydrocarbon synthesis reactor 10, the recovered catalyst particles can be regenerated, rejuvenated or activated. Although not shown in FIG. 1, hydrocarbon synthesis reactor 10 may also comprise a purge 100.

Now referring back to FIG. 1, in certain conditions, the flow rate of reactor gas feed 22 may not meet the minimum fluidization velocity, whereby catalyst bed 27 may slump. Examples of such conditions include lack of availability of a supplemental gas, a loss in supplemental gas flow in the plant, an insufficient flow rate of a supplemental gas, a shut down of total gas flow for maintenance, and the like. In such conditions, it is preferred to utilize at least one porous plate 25 in order to substantially separate the plurality of catalyst particles 35 in the slumped catalyst bed 27 from gas injection zone 65 and gas distributor 55. Therefore, when at least one of the flow rate of reactor gas supply 15 and the flow rate of supplemental gas feed 21 is sufficiently high enough to provide at least the minimum fluidization velocity in hydrocarbon synthesis reactor 10, a sufficient flow of reactor gas feed 22 is achieved to resume fluidization of catalyst particles 35. As the reactor gas feed passes from gas distributor 55 through perforations 37 of porous plate 25 into reaction zone 10, it re-disperses the accumulated catalyst particles 35 deposited on porous plate 25, so that catalyst bed 27 is re-fluidized.

It will be understood that porous plate 25 is not limited to the substantially flat surface and substantially horizontal placement in hydrocarbon synthesis reactor 10 as illustrated in FIG. 1 but instead, can comprise triangular, circular, concave or obtuse shapes, and can further be placed in an inclined or any other desired position. In such embodiments, the total surface area of porous plate 25 onto which catalyst particles 35 deposit in a bed slumping event, may be less than, about equal to, or greater than the cross-sectional area of hydrocarbon synthesis reactor 10.

Figure 3:
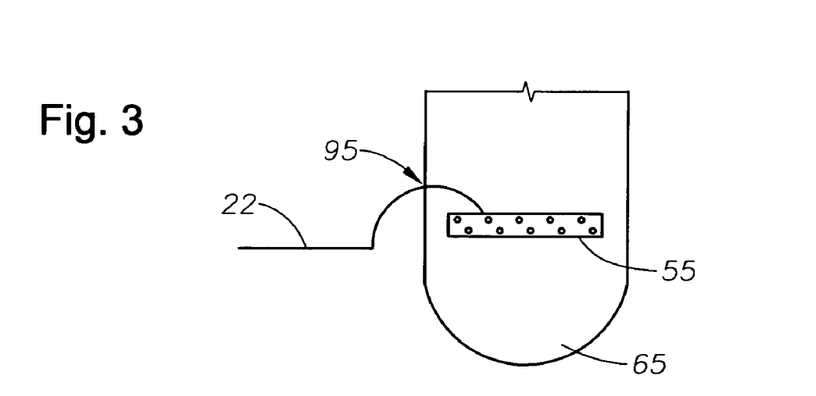
FIG. 3 illustrates an embodiment of the gas-agitated multiphase reactor of FIG. 1 having a gas distributor with an elevated gas feed.

FIG. 3 illustrates an embodiment of the gas-agitated multiphase reactor of FIG. 1 with reactor gas feed 22 having an entry point 95 to gas injection zone 65 that may be higher than an elevation at which gas distributor 55 is disposed within gas injection zone 65. Entry point 95 of reactor gas supply 22 is at an elevation sufficient to substantially prevent some of the content of hydrocarbon synthesis reactor 10 (such as catalyst bed, a liquid, or catalyst slurry) from backing up into reactor gas supply 22 line. It can also be envisioned (although not shown) that entry point 95 to gas injection zone 65 can be placed at a lower elevation than that at which gas distributor 55 is disposed within gas injection zone 65.

Other alternative embodiments comprise hydrocarbon synthesis process 5 having more than one reactor gas feed 22 and/or more than one gas distributor 55 (not illustrated). Further embodiments (not illustrated) include supplying to a hydrocarbon synthesis reactor 10 a gas comprising the supplemental gas and the reactant gas to hydrocarbon synthesis reactor 10 through different gas distributors 55 and/or via a multitude of reactor gas feeds 22. In such alternative embodiments, each reactor gas feed 22 can comprise at least one flow meter. Other alternative embodiments comprise supplying the supplemental gas from more than one supplemental gas supply (not illustrated).

In preferred embodiments of FIGS. 1 and 2, reactor gas supply 15 comprises a reactant gas, and said reactant gas of reactor gas supply 15 that is charged to hydrocarbon synthesis reactor 10 via gas distributor 55 comprises synthesis gas, i.e., a mixture of hydrogen and carbon monoxide. $H_2/CO$ mixtures suitable as a feedstock for conversion to hydrocarbons according to the methods of this invention can be obtained from light hydrocarbons, such as natural gas, or any hydrocarbon with not more than five carbon atoms, by means of steam reforming, auto-thermal reforming, dry reforming, advanced gas heated reforming, partial oxidation, catalytic partial oxidation, or other processes known in the art. Alternatively, the $H_2/CO$ mixtures can be obtained from biomass and/or from coal by gasification. In addition, the reactant gas can comprise off-gas recycle from the present or another hydrocarbon synthesis process. Preferably, the hydrogen is provided by free hydrogen, although some Fischer-Tropsch catalysts have sufficient water gas shift activity to convert some water (and carbon monoxide) to hydrogen (and carbon dioxide) for use in hydrocarbon synthesis process 5. The reactant gas of reactant gas supply 15 used in the present process has a hydrogen to carbon monoxide ($H_2$:CO) molar ratio preferably between about 0.67:1 and about 5:1; more preferably between about 1:1 and about 3:1. Most preferably, when cobalt, nickel, iron, and/or ruthenium catalysts are used, the $H_2$:CO molar ratio is between about 1.4:1 and about 2.3:1. Catalyst particles 35 preferably comprise cobalt and/or ruthenium. The reactant gas used in the present process may further comprise smaller amounts of other gases that do not adversely affect the catalytic performance in the Fischer-Tropsch synthesis, including, but not limited to, carbon dioxide, nitrogen, and argon. However, contaminant gases capable of poisoning the hydrocarbon synthesis catalyst employed in the Fischer-Tropsch synthesis, such as those comprising compounds of nitrogen and sulfur (for example hydrogen sulfide, hydrogen cyanide, ammonia and carbonyl sulfides) should be kept to a minimum level. The reactant gas may need to be pretreated to ensure that it contains very low concentrations of contaminant gases. The reactant gas is contacted with catalyst particles 35 in reaction zone 70. Mechanical arrangements of conventional design may be employed as reaction zone 70 including, for example, fluidized bed, slurry bubble column or ebullating bed reactors, among others. Accordingly, the preferred size and physical form of catalyst particles 35 may vary depending on the reactor in which they are to be used, but are typically less than 0.25 mm. Preferably, catalyst particles 35 comprises a fresh size between about 20 microns and about 200 microns. More preferably, ninety percent by weight of catalyst particles 35 have a fresh size between 20 and 150 microns. Preferably, catalyst particles 35 in reactor 10 have a weight average particle size between about 30 microns and 150 microns, more preferably between 50 and 90 microns. The slurry preferably has a solids loading from 5 wt. % to 40 wt. %. Catalyst bed 27 comprises a catalyst weight percent (wt %) between about 20 wt % and about 40 wt %, preferably between about 25 wt % and about 35 wt %.

Hydrocarbon synthesis process 5 is typically run in a continuous mode. In this mode, the gas hourly space velocity through reaction zone 70 typically may range from about 50 to about 10,000 $hr^{-1}$, preferably from about 300 $hr^{-1}$ to about 2,000 $hr^{-1}$. The gas hourly space velocity defined as the volume of reactants per time per reaction zone volume; wherein the volume of reactant gases is at standard conditions of pressure (101 kPa) and temperature (0° C.); and further wherein the reaction zone volume is defined by the portion of the reaction vessel volume where the reaction takes place and which is occupied by a gaseous phase comprising reactants, products and/or inerts; a liquid phase comprising liquid/wax products and/or other liquids; and a solid phase comprising catalyst. The reaction zone temperature can be in the range from about ambient temperature to about 300° C. Under non-reactive operating conditions, the reaction zone temperature can be below about 180° C. Preferably, reaction zone 70 is operated at conversion promoting conditions at temperatures from about 185° C. to about 300° C., more preferably from about 190° C. to about 260° C.; still more preferably from about 200° C. to about 230° C. The reaction zone pressure is typically in the range of about 80 psia (552 kPa) to about 1,000 psia (6,895 kPa), more preferably from 80 psia (552 kPa) to about 800 psia (5,515 kPa), and still more preferably from about 140 psia (965 kPa) to about 750 psia (5,170 kPa). Most preferably, the reaction zone pressure is in the range of about 250 psia (1,720 kPa) to about 650 psia (4,480 kPa).

The embodiments set forth herein are merely illustrative. Many varying and different embodiments may be made within the scope of the present inventive concept, including equivalent structures hereafter thought of, permutations, substitutions, or combinations of features from the embodiments herein detailed in accordance with the descriptive requirements of the law. Many modifications may be made as well in these embodiments. Because of these reasons, it is to be understood that the details herein are to be interpreted as illustrative and not in a limiting sense. Although the present invention and its advantages have been described in detail, it should be understood that various changes, substitutions and alterations may be made herein without departing from the spirit and scope of the invention as defined by the appended claims.

What is claimed is:

1. A method for operating a gas-agitated fluidized bed hydrocarbon synthesis reactor, wherein the fluidized bed comprises catalyst particles that are prone to slumping at times when an insufficient rate of gas is supplied to the fluidized bed, the method comprising:
   (A) providing the gas-agitated hydrocarbon synthesis reactor comprising a catalyst bed and a gas injection zone, wherein the catalyst bed comprises catalyst particles, and wherein the gas injection zone is suitable for injecting a reactor gas feed with a reactor gas feed flow rate to the catalyst bed, and further wherein the gas injection zone comprises at least one gas distributor;
   (B) selecting a reference flow rate that is sufficient to disperse substantially all of the catalyst particles in the catalyst bed;
   (C) passing a reactor gas supply from the at least one gas distributor in the gas injection zone through the catalyst bed, wherein the reactor gas supply comprises at least a portion of the reactor gas feed;
   (D) measuring the reactor gas feed flow rate;
   (E) comparing the measured reactor gas feed flow rate to the reference flow rate; and
   (F) supplying a supplemental gas to the gas injection zone when the reactor gas feed flow rate becomes less than the reference flow rate.

2. The method of claim 1, wherein the reactor gas supply in step (C) comprises a reactant gas.

3. The method of claim 2, wherein at least a portion of the catalyst particles are active for Fischer-Tropsch synthesis, and wherein the reactant gas comprises carbon monoxide and hydrogen.

4. The method of claim 3, wherein step (C) is preformed under reaction promoting conditions so as to convert at least a portion of the reactant gas to hydrocarbon products.

5. The method of claim 4, wherein reaction promoting conditions comprise a temperature between about 185° C. and about 300° C.

6. The method of claim 1, wherein the supplemental gas comprises at least one gas selected from the group consisting of hydrocarbons having 5 carbon atoms or less, natural gas, argon, nitrogen, hydrogen, carbon dioxide, and combinations thereof.

7. The method of claim 1, wherein step (C) is performed under non-reactive conditions so that substantially all of the reactor gas feed is unconverted while passing through the gas-agitated multiphase reactor.

8. The method of claim 7, wherein non-reactive conditions comprise a temperature less than 180° C.

9. The method of claim 7, wherein the reactor gas supply comprises at least one gas selected from the group consisting of hydrocarbons having 5 carbon atoms or less, natural gas, argon, nitrogen, hydrogen, carbon dioxide, and combinations thereof.

10. The method of claim 1, wherein the supplemental gas is supplied to provide a reactor gas feed flow rate equal to or greater than the reference flow rate.

11. The method of claim 1, wherein the reference flow rate of step (D) comprises a minimum fluidization velocity.

12. The method of claim 11, wherein step (D) further comprises supplying the supplemental gas to the reactor when the reactor gas supply has a reactor gas supply flow rate less than, about equal to, or within a desired range of the minimum fluidization velocity.

13. The method of claim 1, further comprising
   (E) recycling at least a portion of the supplemental gas to the reactor.

14. The method of claim 1, wherein the reactor gas supply and the supplemental gas are supplied separately by at least two different gas distributors.

15. The method of claim 1, wherein the reactor gas supply and the supplemental gas are supplied by one gas distributor.

16. The method of claim 1, wherein the supplemental gas is substantially free of molecular oxygen.

17. The method of claim 1, wherein the supplemental gas is substantially free of sulfur.

18. The method of claim 1, further comprising
   (E) reducing or shutting off the supply of the reactor gas supply.

19. The method of claim 1, further comprising
   (E) separating the catalyst bed from the gas injection zone.

20. The method of claim 19, wherein step (E) further comprises separating the catalyst bed from the gas injection zone by a porous plate, wherein the porous plate comprises a plurality of perforations having open areas.

21. The method of claim 20, wherein at least a portion of the perforations comprise a size sufficient to substantially prevent plugging of the at least one gas distributor by the catalyst particles.

22. The method of claim 21, wherein about each catalyst particle comprises a fresh size of from about 20 microns to about 200 microns.

23. The method of claim 22, wherein at least a portion of the perforations have a size of less than about 20 microns.

24. The method of claim 20, wherein at least a portion of the perforations have a size of less than about 20 microns.

25. The method of claim 20, wherein about 90 percent by weight of the catalyst particles have a fresh size equal to or greater than the size of each perforation.

26. The method of claim 20, wherein the porous plate has a cross-sectional area, and wherein the perforations comprise a total open area of from about 10 to about 90 percent of the cross-sectional area of the porous plate.

27. The method of claim 20, wherein the gas-agitated hydrocarbon synthesis reactor comprises a cross-sectional area, and wherein the porous plate comprises a cross-sectional area from about 10 to about 100 percent of the cross-sectional area of the gas-agitated multiphase reactor.

28. A method of operating a gas-agitated multiphase reactor having catalyst elements that are prone to slumping at times of insufficient gas flow through the multiphase reactor, the method comprising:
   (A) supplying a reactant gas at a reactant gas flow rate to the gas-agitated multiphase reactor;
   (B) measuring the reactant gas supply flow rate;
   (C) comparing the measured flow rate of the reactant gas to a reference flow rate; and
   (D) supplying a supplemental gas to the gas-agitated multiphase reactor when the reactant gas flow rate falls below said reference flow rate so as to provide a total gas flow rate above the reference flow rate wherein the total gas flow rate is the combination of reactant gas and supplemental gas being supplied to the reactor.

29. The method of claim 28, wherein the gas-agitated multiphase reactor is sufficient for Fischer-Tropsch synthesis.

30. The method of claim 28, wherein reactant gas comprises hydrogen and carbon monoxide.

31. The method of claim 28, wherein the supplemental gas has a flow rate, and wherein step (D) further comprises regulating the supplemental gas flow rate so as to provide to the gas-agitated multiphase reactor a total gas flow rate of reactant gas and supplemental gas about equal to or greater than the reference flow rate.

32. The method of claim 28, wherein the reference flow rate of step (C) comprises a minimum fluidization velocity.

33. The method of claim 32, wherein step (D) further comprises supplying the supplemental gas to the gas-agitated multiphase reactor when the measured flow rate of the reactant gas is less than or about equal to the minimum fluidization velocity.

34. The method of claim 28, wherein step (D) further comprises supplying the supplemental gas to the gas-agitated multiphase reactor when the measured flow rate of the reactant gas is less than or about equal to the reference flow rate.

35. The method of claim 28, the supplemental gas comprises at least one gas selected from the group consisting of any hydrocarbon having 5 carbon atoms or less, natural gas, argon, nitrogen, hydrogen, carbon dioxide, and any combinations thereof.

36. The method of claim 28, wherein the supplemental gas is substantially free of molecular oxygen.

37. The method of claim 28, wherein the supplemental gas is substantially free of sulfur.

38. The method of claim 28, further comprising
(E) separating at least one reaction zone from a gas injection zone, wherein steps (A) and (D) are performed by at least one gas distributor in the gas injection zone.

39. The method of claim 38, wherein step (E) further comprises separating the at least one reaction zone from the gas injection zone by a porous plate, wherein the porous plate comprises a plurality of perforations having open areas.

40. The method of claim 39, wherein at least a portion of the perforations comprise a size sufficient to substantially prevent plugging of the at least one gas distributor by catalyst particles.

41. The method of claim 39, wherein about each catalyst particle comprises a fresh size of from about 20 microns to about 200 microns.

42. The method of claim 41, wherein at least a portion of the perforations have a size of less than about 20 microns.

43. The method of claim 39, wherein at least a portion of the perforations have a size of less than about 20 microns.

44. The method of claim 39, wherein about 90 percent by weight of the catalyst particles have a fresh size equal to or greater than the size of each perforation.

45. The method of claim 39, wherein the porous plate has a cross-sectional area, and wherein the perforations comprise a total open area of from about 10 to about 90 percent of the cross-sectional area of the porous plate.

46. The method of claim 39, wherein the gas-agitated hydrocarbon synthesis reactor comprises a cross-sectional area, and wherein the porous plate comprises a cross-sectional area from about 10 to about 100 percent of the cross-sectional area of the gas-agitated multiphase reactor.

47. The method of claim 28, further comprising
(E) recycling at least a portion of the supplemental gas to the gas-agitated hydrocarbon synthesis reactor.

48. The method of claim 28, wherein the reactant gas and the supplemental gas are supplied separately to the gas-agitated hydrocarbon synthesis reactor by at least two different gas distributors.

49. The method of claim 28, wherein the reactant gas and the supplemental gas are supplied by at least one gas distributor, and wherein the at least one gas distributor comprises at least one sparger, at least one nozzle, or combination thereof.

50. The method of claim 28, further comprising
(E) reducing or shutting off the supply of the reactant gas.

51. A method of operating a hydrocarbon synthesis reactor, wherein the hydrocarbon synthesis reactor comprises a plurality of catalyst particles suspended in a liquid and having gas agitating the particles and liquid so as to maintain a distribution of particles in the liquid and prevent the particles from slumping, the method comprising:
(A) supplying a reactant gas to the hydrocarbon synthesis reactor, wherein the reactant gas is supplied to the hydrocarbon synthesis reactor in a gas injection zone, and wherein the reactant gas has a reactant gas supply flow rate to the hydrocarbon synthesis reactor;
(B) reacting the reactant gas with the plurality of catalyst particles in a reaction zone;
(C) measuring the reactant gas supply flow rate to the hydrocarbon synthesis reactor;
(D) comparing the measured flow rate of the reactant gas to a reference flow rate; and
(E) supplying a supplemental gas to the hydrocarbon synthesis reactor in the reaction zone, wherein the supplemental gas is supplied to the hydrocarbon synthesis reactor when the measured flow rate of the reactant gas falls below the reference flow rate, so as to provide to the hydrocarbon synthesis reactor a total gas flow rate of reactant gas and supplemental gas equal to or greater than the reference flow rate.

52. The method of claim 51, wherein the hydrocarbon synthesis reactor comprises a gas-agitated multiphase reactor.

53. The method of claim 51, wherein the reactant gas comprises hydrogen and carbon monoxide.

54. The method of claim 51, wherein the supplemental gas has a flow rate, and wherein step (E) further comprises regulating the supplemental gas flow rate to have the total gas flow rate to the hydrocarbon synthesis reactor about equal to or greater than the reference flow rate.

55. The method of claim 51, wherein the reference flow rate of step (D) comprises a minimum fluidization velocity.

56. The method of claim 51, wherein the supplemental gas comprises at least one gas selected from the group consisting of any hydrocarbons having 5 carbon atoms or less, natural gas, argon, nitrogen, hydrogen, carbon dioxide, and any combinations thereof.

57. The method of claim 51, wherein the supplemental gas is substantially free of molecular oxygen.

58. The method of claim 51, wherein the supplemental gas is substantially free of sulfur.

59. The method of claim 51, further comprising
(F) separating the reaction zone from the gas injection zone.

60. The method of claim 59, wherein step (F) further comprises separating the reaction zone from the gas injection zone by a porous plate, wherein the porous plate comprises a plurality of perforations having open areas.

61. The method of claim 60, wherein at least a portion of the perforations comprise a size sufficient to substantially prevent plugging of a gas distributor by catalyst particles.

62. The method of claim 60, wherein about each catalyst particle comprises a fresh size of from about 20 microns to about 200 microns.

63. The method of claim 60, wherein at least a portion of the perforations have a size of less than about 20 microns.

64. The method of claim 60, wherein about 90 percent by weight of the catalyst particles have a fresh size equal to or greater than the size of each perforation.

65. The method of claim 60, wherein the porous plate has a cross-sectional area, and wherein the perforations comprise a total open area of from about 10 to about 90 percent of the cross-sectional area of the porous plate.

66. The method of claim 60, wherein the porous plate comprises a cross-sectional area from about 10 to about 100 percent of a cross-sectional area of the hydrocarbon synthesis reactor.

67. The method of claim 51, further comprising
(F) recycling at least a portion of the supplemental gas to the hydrocarbon synthesis reactor.

68. The method of claim 51, wherein the reactant gas and the supplemental gas are supplied separately to the hydrocarbon synthesis reactor by at least two different gas distributors.

69. The method of claim 51, wherein the reactant gas and the supplemental gas are supplied to the hydrocarbon synthesis reactor by at least one gas distributor.

70. The method of claim 51, further comprising:
(F) reducing or shutting off the supply of the reactant gas.

* * * * *